United States Patent [19]
Guthmann

[11] Patent Number: 4,734,961
[45] Date of Patent: Apr. 5, 1988

[54] SLIDING BOLT PRESSING SURFACES TYPE ROPE WIDENING APPARATUS

[76] Inventor: Stephen F. Guthmann, 1 Brandon Rd., DeWitt, N.Y. 13214

[21] Appl. No.: 853,420

[22] Filed: Apr. 14, 1986

Related U.S. Application Data

[63] Continuation-in-part of Ser. No. 381,719, May 24, 1982, abandoned.

[51] Int. Cl.[4] ............................................. F16G 11/05
[52] U.S. Cl. .................................. 24/122.6; 24/114.5; 24/136 R
[58] Field of Search ............ 339/105; 24/122.6, 114.5, 24/115 M, 115 N, 122.3, 136 L, 136 R; 174/279; 52/230, 223 L; 403/275, 369

[56] References Cited

U.S. PATENT DOCUMENTS

| | | | |
|---|---|---|---|
| 854,957 | 5/1907 | Miller et al. | 24/114.5 |
| 1,197,674 | 9/1916 | Shaw | 24/114.5 |
| 1,440,504 | 1/1923 | Snow | 403/275 |
| 1,855,227 | 4/1932 | Fiege | 403/275 X |
| 2,017,887 | 10/1935 | Blackburn | 52/223 L |
| 2,032,567 | 3/1936 | Fiege | 24/122.6 X |
| 2,417,465 | 3/1947 | Botts | 24/114.5 X |
| 2,935,776 | 5/1960 | Clark et al. | 403/369 |
| 3,562,406 | 2/1971 | Uhlig | 24/122.6 X |
| 3,723,636 | 3/1973 | Eucker | 24/122.6 X |
| 3,775,811 | 12/1973 | Smrekar et al. | 24/122.6 |
| 4,055,365 | 10/1977 | Kucherry | 24/122.6 X |
| 4,177,542 | 12/1979 | Denney | 24/122.6 X |
| 4,458,389 | 7/1984 | Guthmann | 24/122.6 X |
| 4,464,812 | 8/1984 | Crook, Jr. et al. | 24/122.6 |

FOREIGN PATENT DOCUMENTS

| | | | |
|---|---|---|---|
| 1450345 | 8/1966 | France | 24/115 M |
| 370390 | 4/1973 | U.S.S.R. | 24/122.6 |

Primary Examiner—Kenneth J. Dorner
Assistant Examiner—James R. Brittain

[57] ABSTRACT

A rope widening apparatus in which a sliding bolt is disposed within the strands of a rope so that a tensile force on the rope draws it and its downstream convex tapered pressing surface toward a concave frustum pressing surface on a case front portion, thus pressing the strands between the two surfaces - the harder the pull on the rope, the harder the strands are pressed between the surfaces. The sliding bolt is configured to utilize the locking phenomenon of tubular interlocking stranded rope to prevent the sliding bolt from moving upstream along the rope.

40 Claims, 9 Drawing Sheets

SLIDING BOLT PRESSING SURFACES TYPE ROPE WIDENING APPARATUS

This application is a continuation in part of my co-pending application Ser. No. 06/381,719 filed May 24, 1982, abandoned for a Rope Widening Apparatus, Sliding Bolt Pressing Surfaces Type; and it is my understanding that those items disclosed herein which are the same as those disclosed in said copending application will have the same filing date as said co-pending application.

BACKGROUND OF THE INVENTION

1. Field of the Invention

The present invention relates to devices for holding or widening tubular interlocking stranded rope or cable or of placing protuberances or bulges thereon which are immovable longitudinally along the rope. The bulge increases the diameter of the rope to create, for example, an abutment that prevents longitudinal movement of the rope past a mating abutment or stop member.

The words braid, plait, weave, intertwine, interlace or mesh have some similarity of meanings. For purposes of this patent they are deemed to be exactly synonymous. Herein they mean a number of strands or strand groups united to form a rope by intercrossing or stitching or passing over and under each other such that a rod passing transversely through the rope so formed is immovable longitudinally along the rope. Such rope has a set of such stitches arrayed in a circle on a transverse plane through the rope, with numerous such sets of stitches along the length of the rope. Any stitch or set of stitches sufficiently away from an end of the rope is substantially immovable longitudinally of the rope so that if lengthwise strain is placed upon a stitch or set of stitches on a common transverse plane, the stitches will not unravel. Therefore, there will be no decrease in the number of stitches upstream of the point of, or transverse plane of lengthwise strain, although the upstream stitches may crowd. And therefore, the strands or strand groups of such rope may be said to interlock and such rope exhibits a locking phenomenon. This invention is for use with such interlocking stranded rope, and not for use with twisted rope having no stitches.

The word tubular herein means a rope in which the strands or strand groups thereof can be arranged to substantially surround an object. This invention is for use with tubular rope.

That is, the type of rope intended to be used with this invention is tubular interlocking stranded rope as hereinabove defined.

2. Description of the Prior Art

Reduced to its most fundamental function, wherever rope is used, its purpose is to prevent two objects from moving apart more than a maximum distance from each other. Therefore, to be useful, a rope must be held at at least two points. To accomplish this objective, rope must be connected to each object, with one object connected at one point on the rope and the other connected at a point longitudinally spaced from the first point of connection. All prior methods or devices of connection known to this inventor, such as knots, eye splices or transverse rods throught the rope, have weakened the rope—that is, decreased its resistance to tension. Furthermore, this inventor knows of no rope bulging method or connecting or widening device which employs the locking phenomenon of tubular interlocking stranded rope as described herein, either alone or in combination with pressing surfaces, except that described in this inventor's U.S. Pat. No. 4,458,389.

U.S. Pat. No. 2,032,567, Feige, discloses a cable hitch with a two-part cavity, threadably secured, enclosing a cable expanded over a wedging element. The wedging element has a downstream convex conical taper and has lands and grooves along its entire length, in which the strand groups partially nest. The cavity has only one aperture which is downstream of the wedging element and which is large enough to allow an unexpanded portion of the cable to pass therethrough, but too small to allow the portion of the cable expanded over the wedging element to pass therethrough. The upstream end of the cavity is a closed cup containing the freyed cable ends. The cable is pressed downstream and clamped between the downstream convex conical taper of the wedging element and the downstream concave frustum of the cavity during the process of threading the cavity portions together. The freyed cable ends are also bent over and twisted around the upstream end of the wedging element as the cavity portions are threaded together. Feige's cable hitch is not suitable for use with woven rope because it lacks an upstream aperture so that there would be insufficient rope upstream of the wedging element for the locking phenomenon of woven rope to occur upon the application of tension; and because the longitudinal grooves are shallower than the diameters of the individual strand groups, a given pick or stitch or strand group crossover point could not be maintained upstream of the upstream edge of a land because the strand groups would be pulled downstream over the tops of the lands, as will be more fully explained. It should be noted that the Fiege termination can only be used on an end point while the subject rope widening apparatus can only be used at an intermediate point.

U.S. Pat. No. 2,935,776, Clark, discloses a Cable Shackle with a one piece open cavity. The cavity is a concave frustum surface with the narrow opening downstream. The cavity contains a core portion with a plurality of elongated helical grooves along its entire periphery. The core portion is divided longitudinally into two wedge pieces forming a longitudinally divided elongated bore whose axis is coincident with the axis of the core portion. The elongated bore is for gripping the center unconvoluted core strand of a cable, while the helical grooves on the periphery receive the convoluted strands of the cable which wind helically about the unconvoluted core strand. The helical grooves on the periphery of the core portion are only partially as deep as the diameters of the convoluted cable strands. Thus, when the cable, expanded over the core portion, is wedged into the concave frustum of the cavity, the convoluted strands are firmly held. Also, the elongated bore has a shorter diameter than the diameter of the unconvoluted core strand, thus the sides of the elongated bore grip the core strand when the wedge pieces are forced together by being wedged into the concave frustum of the cavity. The Clark Cable Shackle is not suitable for use with woven rope because the helical grooves on the periphery of the core portion spiral in one direction, while the strand groups of woven rope spiral in two opposite directions, so that the helical grooves could not accept those strand groups of woven rope which spiral in the direction opposite of the helical grooves without creating bending stresses where the strand groups touch the upstream and downstream ends of the grooves; and, since the helical lands are shorter than the diameters of the individual strand groups, a given pick or stitch or strand group crossover point could not be maintained upstream of the upstream edge of a land because the strand groups would be pulled downstream over the tops of the lands, as will be more fully explained.

The aforementioned two inventions of Fiege and Clark are for use with twisted—not woven—steel wire cable. Steel wire cable is not as pliant as fabric rope made of such materials as nylon, polyethelyne or polypropolene. Because of its flexibility, light weight and cushioned surface, fabric rope is used where steel cable is not appropriate. For example, steel wire cable can mar polished boat hulls. Also, because of its stiffness, steel wire cable cannot be stored as compactly as fabric rope. Woven fabric rope, because the strand groups interweave and spiral in two opposite directions, cannot hockle as can twisted fabric rope. It is therefore desireable to use woven fabric rope and find a device to hold it without creating a weakness.

It is this inventor's experience that twisted pliant rope can be held only with knots and eye splices, both of which have a greater or lesser weakening effect. It is generally known that knots weaken a rope by 50% because of the bending stresses, and eye splices have a slight weakening effect. In this inventor's experiments with twisted pliant fabric rope (as distinguished from woven rope) using longitudinally grooved wedging elements similar to those in the aforementioned Fiege and Clark patents, the rope was pulled through the grooves rather than held in the fixture until the rope broke. Apparently this does not occur with twisted steel cable, possibly because the wires bite into the wedging elements or the wedging elements may have teeth to bite into the cable strands. For example, Fiege, in another patent, U.S. Pat. No. 1,958,747, shows thin circumferential grooves that apparently bite into the wire strands. However, the edges of such circumferential grooves would cut fabric rope strands.

Other devices similar to those of Fiege or Clark for holding steel wire cable in which the grooves in the wedging element are shallower than the diameters of the cable strands and/or in which the grooves spiral in only one direction, are shown in U.S. Pat. Nos. 1,909,332; 2,017,887; 3,600,765; 4,055,365; French Pat. No. 1,450,345; British Pat. Nos. 512,893 and 1,056,990.

SUMMARY OF THE INVENTION

It is the purpose of this invention to provide: (1) a method of attaching rope without creating weakness at the point of attachment; (2) a quick releasable fixture for attaching rope; (3) a method of widening rope at intermediate points, as opposed to end points, so that the effective length of the rope and therefore the distance between two objects may be quickly adjusted; (4) to cover the rope at contact points of the attached object to prevent line chafe; and (5) to be used in conjunction with this inventor's boat mooring apparatuses, described in U.S. Pat. Nos. 4,109,603 and 4,190,011 as an alternative form of a bulge.

Rope can be more easily held if it has a longitudinally immovable bulge on it, sufficiently wider than the rest of the rope, so that the bulge can be placed upstream of a stop member. The bulge or exterior of the case of the rope widening apparatus may be formed into most any desired shape.

The interior of the case has a downstream concave frustum surface. A sliding bolt inside the case has a downstream convex tapered surface. Woven rope is transversely expanded over the entire sliding bolt; except that radial fids on the sliding bolt protrude transversely between and past the rope strands to keep the rope symmetrically oriented around the sliding bolt and to prevent a stitch or crossover point from moving downstream upon the application of a longitudinal tensile force. (A fid is a rod-like device used to pry apart rope strands).

A downstream pull on the rope causes the stitches on the rope upstream of the sliding bolt to crowd because the stitches cannot move past the radial fids. Thus, the sliding bolt is forced downstream by the portion of the rope upstream of the sliding bolt. And thus, the portion of the rope adjacent the downstream convex tapered surface of the sliding bolt is pressed between it and the downstream concave frustum surface of the case.

The force applied to the rope to draw the outside abutting surface of the case of the rope widening apparatus tighter against a stop member, is also used to press the rope strands between the convex surface of a cone and the concave surface of a frustum, by drawing the sliding bolt downstream towards the stop member, and therefore towards the concave frustum surface of the case. Because, the tubular interlocking stranded rope is locked upstream of the sliding bolt and therefore draws the sliding bolt downstream along with it.

An object of this device is to widen the rope as a knot does, but without weakening the rope in tension; and in such a way that the rope widening apparatus will not slide longitudinally along the rope, nor that the device itself will be sheared off.

DESCRIPTION OF A PREFERRED EMBODIMENT

Figure 1:
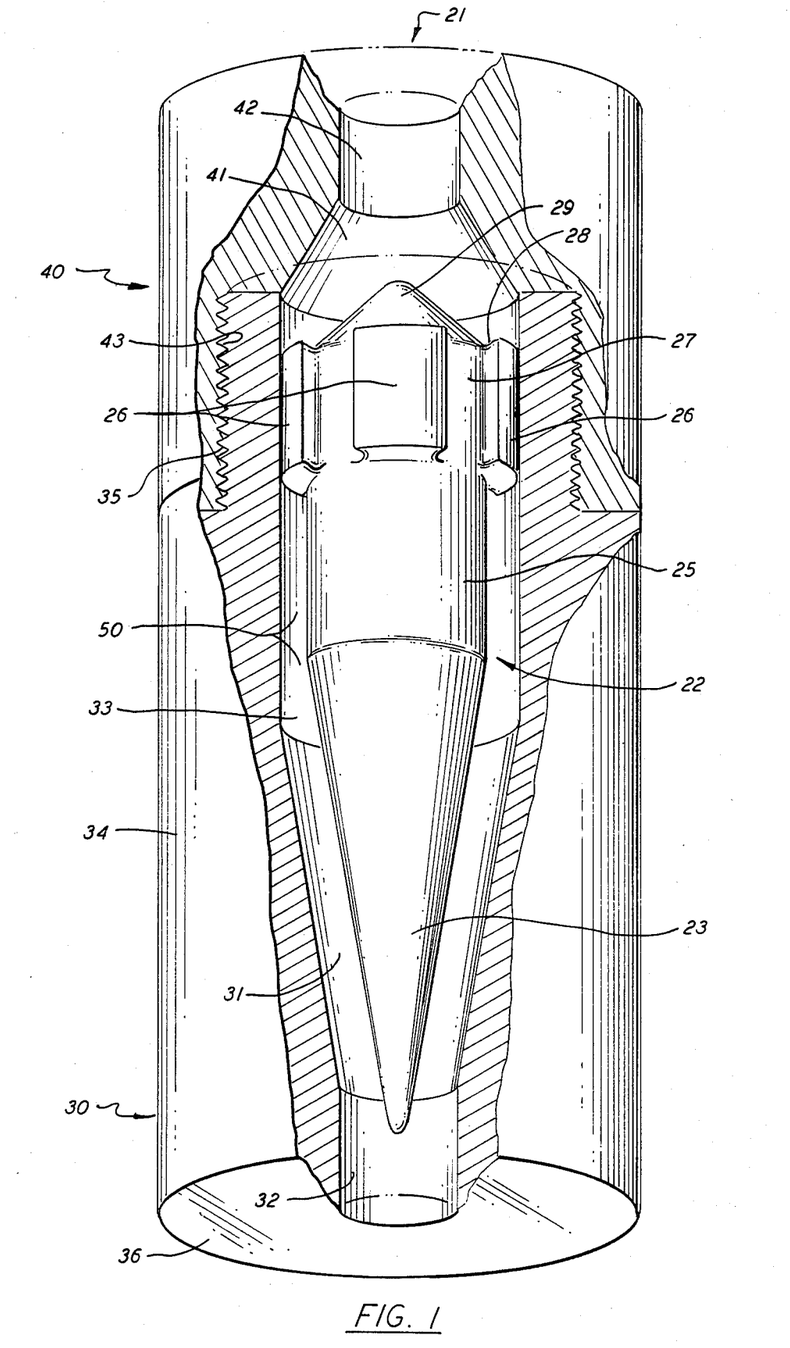
FIG. 1 is a perspective view, partially in section and partially in phantom, of a fundamental embodiment of the invention.
Figure 2:
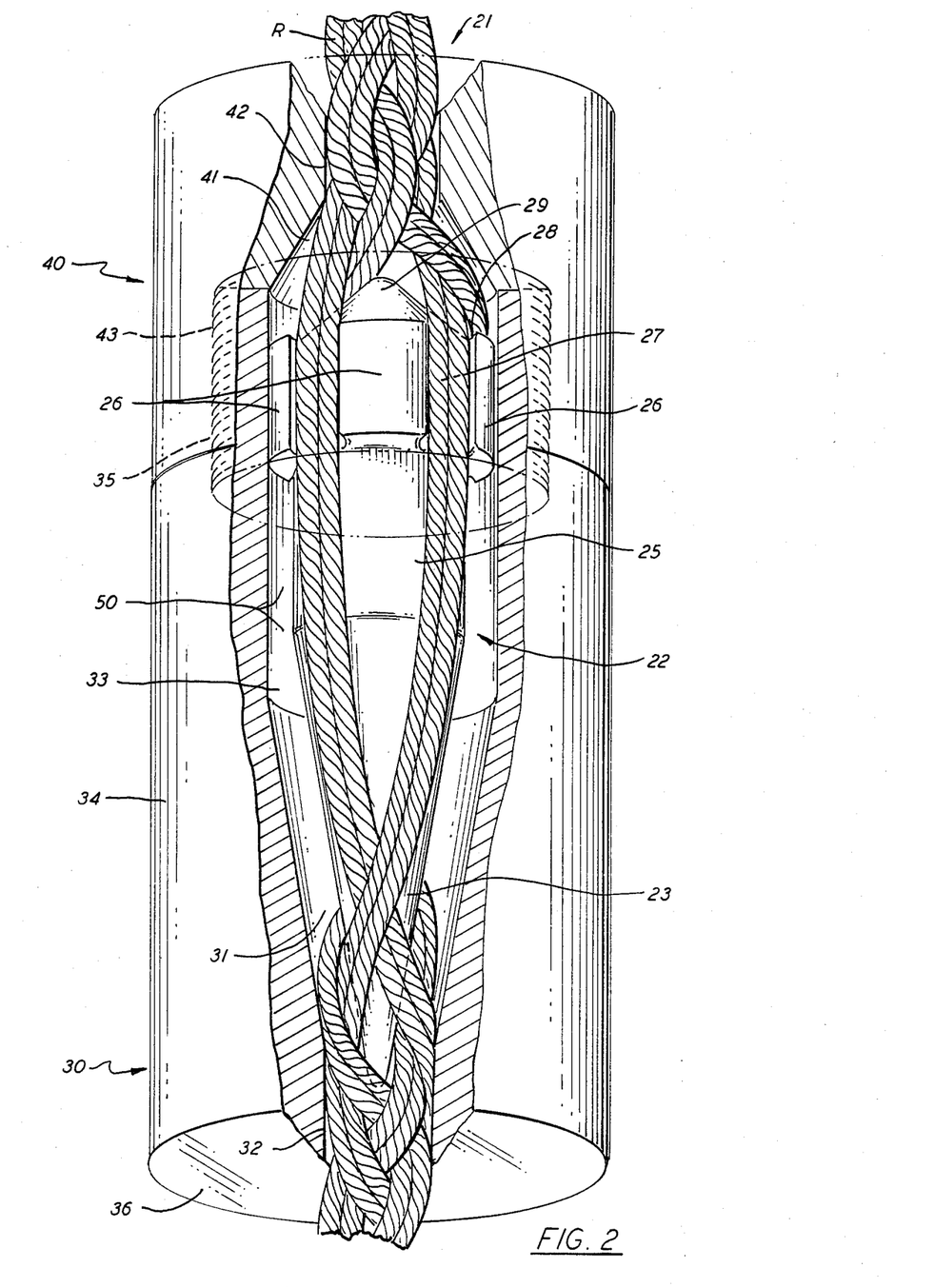
FIG. 2 is a perspective view, partially in section and partially in phantom, of a fundamental embodiment of the invention, but with the addition of a rope.
Figures 3, 4, 5, 6:
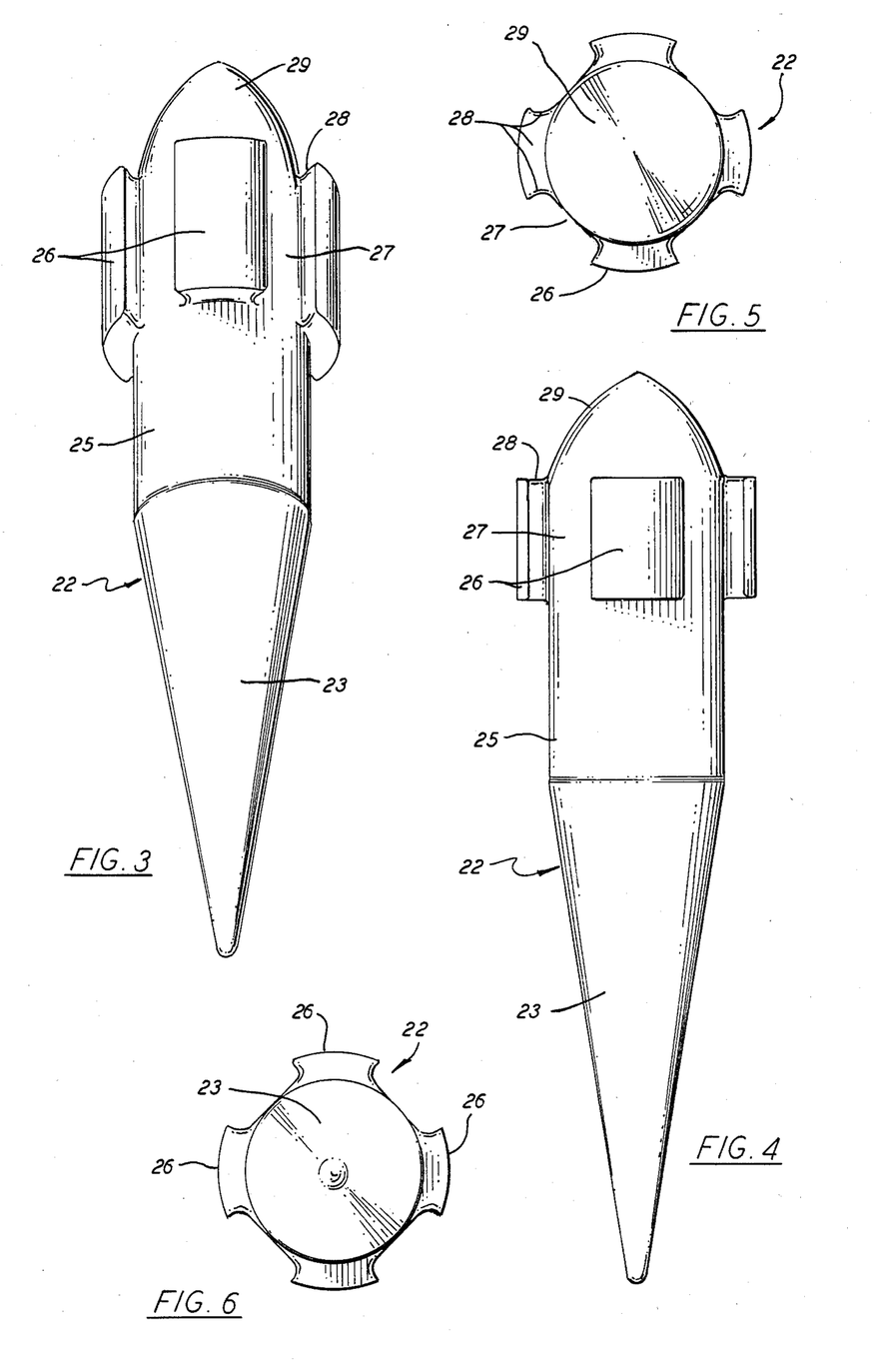
FIG. 3 is a perspective view of a fundamental embodiment of the sliding bolt as shown in FIGS. 1 and 2.
FIG. 4 is a side view of the sliding bolt shown in FIGS. 1, 2, & 3, viewing a fid perpendicularly.
FIG. 5 is a back end view of the sliding bolt shown in FIGS. 1 through 4.
FIG. 6 is a front end view of the sliding bolt shown in FIGS. 1 through 5.

Referring now to FIGS. 1 and 2, partial sectional and phantom perspective views of a preferred embodiment are shown, with FIG. 2 illustrating the components assembled in working relationship onto Rope R.

Rope R is one example of a tubular interlocking stranded rope. It has four strand groups with two strands in each strand group. It is tubular since the strands can be arranged to surround the sliding bolt 22. It is interlocking since the radial fids 26, when protruding between and past the strand groups, prevent the sliding bolt 22 from moving longitudinally along the rope by causing the strand groups to lock around and upstream of sliding bolt 22.

There are numerous variations of tubular interlocking stranded ropes, each with its own number and unique configuration of strands. For each such variation, a specially configured sliding bolt may be used, with an appropriate number of fids extending radially from the surface of the sliding bolt and protruding between and past the interlocking strands or strand groups. Various configurations of sliding bolts are shown in this patent; and, the principles disclosed in this patent may be applied, where practical, to ropes with a different number or configuration of tubular interlocking strands, or where one set of tubular interlocking strands is disposed over an inner set of tubular interlocking strands. The fids are the embodiments of the transverse rods aforementioned, which, when passed transversely through interlocked rope, will be immovable longitudinally of the rope.

A preferred embodiment of the apparatus 21 shows its three fundamental components, viz; the sliding bolt 22, the case front portion 30 and the case rear portion 40. The case portions 30 and 40 mutually form a cavity 50 when assembled. Although advantageous, the case rear portion 40 is not necessary for the operation of the pressing surfaces, or for the utilization of the locking phenomenon of tubular interlocking stranded rope as hereinafter described.

The sliding bolt 22, shown apart from the case portions in FIGS. 3 through 6 comprises a downstream convex conical pressing surface 23, a cylindrical portion 25 disposed at the base of the downstream convex conical pressing surface 23, a group of fids 26 upstream of the cylindrical portion 25 which between them define grooves 27, and a tapered portion, e.g. a rounded cone 29 upstream of the group of fids.

Figure 7:
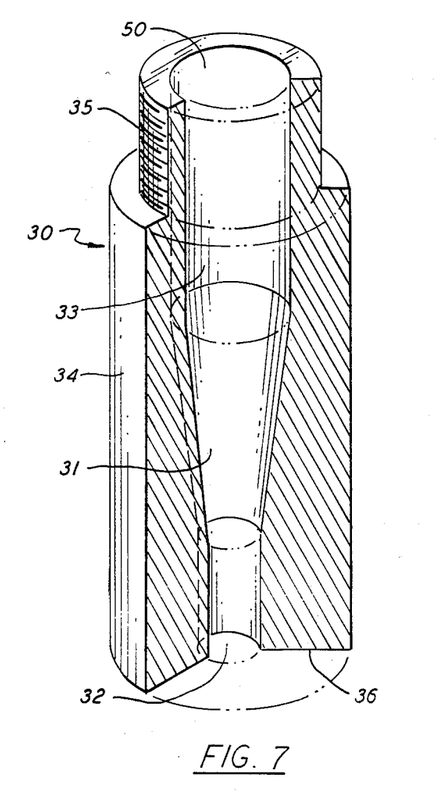
FIG. 7 is a perspective view, partially in section and partially in phantom, of the front portion of the case shown in FIGS. 1 & 2.

The case front portion 30, also shown separately in FIG. 7, comprises a central bore including a downstream concave frustum pressing surface 31, a narrow cylindrical aperture 32 aligned along the longitudinal axis of the downstream concave frustum pressing surface 31, whose diameter is the same as the diameter of the small circle of the frustum 31, a wide cylindrical cavity surface 33, also aligned along the longitudinal axis of the frustum 31, whose diameter is the same as the diameter of the large circle of the frustum 31. The outside surface of the case front portion includes a large diameter cylindrical segment 34 which is approximately coextensive with the surface 31 and the aperture 32. Said outside surface includes a male threaded cylindrical extension 35 which is approximately coextensive with the surface 33. The outside surface of the case front portion also includes an exterior abutting surface 36, the plane of which is approximately perpendicular to the longitudinal axis of the central bore.

The downstream convex conical pressing surface 23 of the sliding bolt 22 has an angle related to the associated downstream concave frustum pressing surface 31 of the case front portion 30; that is, the pressing surfaces are approximately parallel, meaning that they face each other, so that, as shown in FIG. 2, the rope R, when disposed around the downstream convex conical pressing surface 23 and inserted into the case front portion 30 and through aperture 31, will be evenly pressed against the associated downstream concave frustum pressing surface 31 by the downstream convex conical pressing surface 23 by a longitudinal tensile force on the rope R in a direction tending to draw rope R out of the cavity 50 and towards and through aperture 32. The downstream convex conical pressing surface on the sliding bolt may have an inward slope somewhat greater than the inward slope of the concave frustum pressing surface of the case front portion, depending on the length of the pressing surfaces. However, no specific angular relationships are claimed herein.

The upstream and upstream side surfaces 28 of the fids 26 cause the strand groups to lock around and upstream of the upstream tapered portion 29 and therefore upstream of the sliding bolt 22; thus preventing the rope from being drawn longitudinally downstream completely through the aperture 32 and out of the cavity 50.

As shown in FIG. 2, a section of the strand groups of rope R passes between radial fids 26 with each strand group lying in an associated groove 27 such that the rope is substantially symmetrically disposed about the sliding bolt 22.

It is also possible to use half the number of radial fids 26 and therefore grooves 27 such that two strands or groups of strands lie in each associated groove 27, although such may not be the best configuration of the sliding bolt 22 for use with the rope herein illustrated.

The cylindrical portion 25 of the sliding bolt 22 has a diameter short enough to allow the strands of the rope, when symmetrically disposed thereabout, to fit within the cylindrical cavity surface 33 of the case front portion 30, while being long enough to provide a slidably snug fit of the strands of the rope within cylindrical cavity surface 33.

Figure 8:
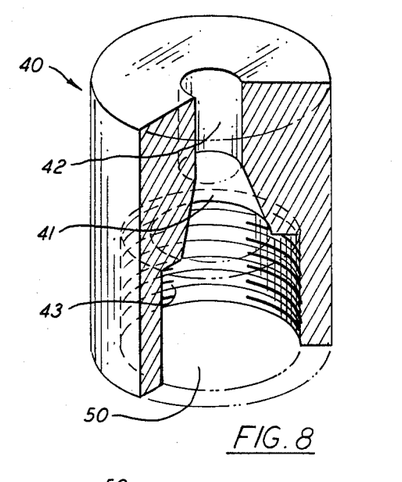
FIG. 8 is a perspective view, partially in section and partially in phantom, of the back portion of the case shown in FIGS. 1 & 2.

The case rear portion 40, shown separately in FIG. 8, comprises a central bore including a concave frustum surface 41 and a narrow cylindrical aperture 42, whose diameter is the same as the diameter of the small circle of the concave frustum surface 41. There is also an internal threaded portion 43 matable with the externally threaded extension 35, of the case front portion 30 so that the case rear portion 40 may be threadibly secured to case front portion 30. However, case portions 30 and 40 may be secured in any suitable manner, for example, by a bayonet joint to complete the formation of cavity 50.

To prevent the sliding bolt 22 with the rope disposed thereabout from falling out of the cavity 50, the diameter of cylindrical aperture 42 is shorter than the diameter of the sliding bolt 22 at the cylindrical portion 25 and the section of radial fids 26, and is sufficiently long to allow rope R to pass therethrough, and therefore short enough to prevent rope R from passing therethrough at that portion of rope R disposed over insert 22. That is, aperture 42 provides a slidable snug fit around an unexpanded portion of rope R and also helps to prevent irregular strand group orientation when the rope is under extreme tension. The concave frustum surface 41 also may help to provide a slidable snug fit of that portion of the rope R disposed over the upstream cone 29, depending on how far downstream in the cavity 50 the sliding bolt is drawn and on the bulk of the rope, to help prevent an irregular strand orientation, when the strands lock tightly upon the application of a longitudinal tensile force on the rope R in a direction from the cavity 50 towards the aperture 32—i.e. a downstream longitudinal tensile force.

All surfaces and corners of the cavity 50, the apertures 32 and 42, and all sliding bolt surfaces touching the rope are rounded and smooth so that the rope R will neither cut nor abraided, nor the strand groups pierced.

Now describing the operation of the rope widening apparatus 21, the surface 36 of the case front portion 30 is an abutting surface. It may be placed in contact with any appropriate stop member. An example of such stop members are shown in U.S. Pat. Nos. 4,109,603 and 4,190,011 describing the inventions of boat mooring apparatuses. The appliance 21 may be placed at desired intermediate points on a rope to provide an abutting or attaching means for the rope. When the abutting surface 36 is placed in contact with a stop member and the rope R is drawn longitudinally in a direction from aperture 42 through cavity 50 and towards aperture 32, the rope will be prevented from sliding through and out of the cavity 50 and therefore out of the appliance 21, because the sliding bolt 22, and more specifically mating convex conical pressing surface 23 of the sliding bolt 22, will be drawn downstream towards aperture 32, thereby pressing rope R between convex conical pressing surface 23 and mating concave frustum pressing surface 31. As can be seen, the greater the longitudinal tension of the rope R tending to draw the rope R out of the cavity 50, the greater will be the pressing force on that portion of rope R between surface 23 and surface 31, and because the greater will be the force locking the strands together and upstream of the sliding bolt 22. That is, the greater the force tending to pull the rope out of the rope widening apparatus, the greater the force pressing the strands between the pressing surfaces; and therefore the greater the force holding the rope in the rope widening apparatus.

Put another way, the pressing surfaces are drawn together and the rope R held in appliance 21 by the same force tending to pull the rope R out of the rope widening apparatus.

Again, stated another way, the sliding bolt slides downstream in response to a longitudinal tensile force on the rope when the rope is appropriately disposed over the sliding bolt. Upon the application of a longitudinal tensile force on the rope, the downstream convex conical pressing surface of the sliding bolt moves downstream towards the concave frustum pressing surface portion of the cavity surface of the case front portion, thus pressing the rope between the two pressing surfaces.

Notwithstanding the pressing force on that portion of rope R between surfaces 23 and 31, under the aforementioned tensioned condition, the rope R would be drawn out of cavity 50, without the utilization of the locking phenomenon of the tubular interlocking stranded rope as provided by the invention herein disclosed, and more specifically by radial fids 26, the surfaces 28 thereof and the tapered portion, e.g., upstream cone 29 of the sliding bolt 22. Because, the radial fids 26, and more specifically their upstream and upstream side surfaces, symmetrically orient the strands around the sliding bolt and cause the strand groups to transverely compress aroung the upstream cone 29 upon the application of a longitudinal tensile force on rope R. It is intended that rope widening apparatus 21 be so proportioned that the combination of the convex conical pressing surface 23, the associated concave frustum pressing surface 31 and the tapered portion 29 distribute the force acting on rope R over a wide area. The longitudinal tensile force on the rope R is transferred from the tapered portion 29 through the sliding bolt 22 to its downstream convex conical pressing surface 23, again through the rope to the downstream concave frustum pressing surface 31 of the case front portion 30, then to the exterior abutting surface 36 and finally to an appropriate stop member.

Figure 21:
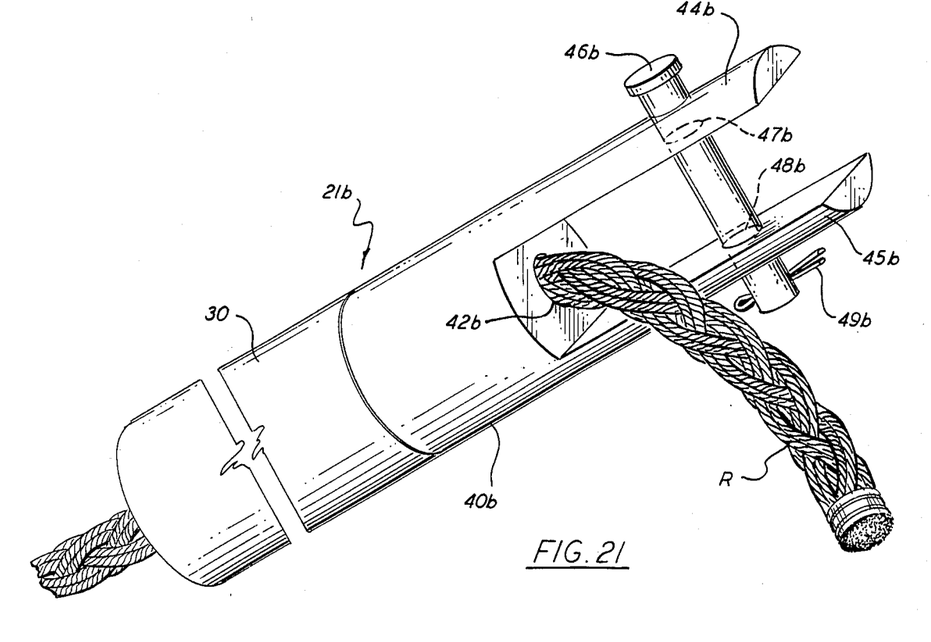
FIG. 21 is a perspective view of an alternative embodiment of the rear portion of the case shown in FIG. 8 with the addition of a shackle attaching arrangement.
Figure 22:
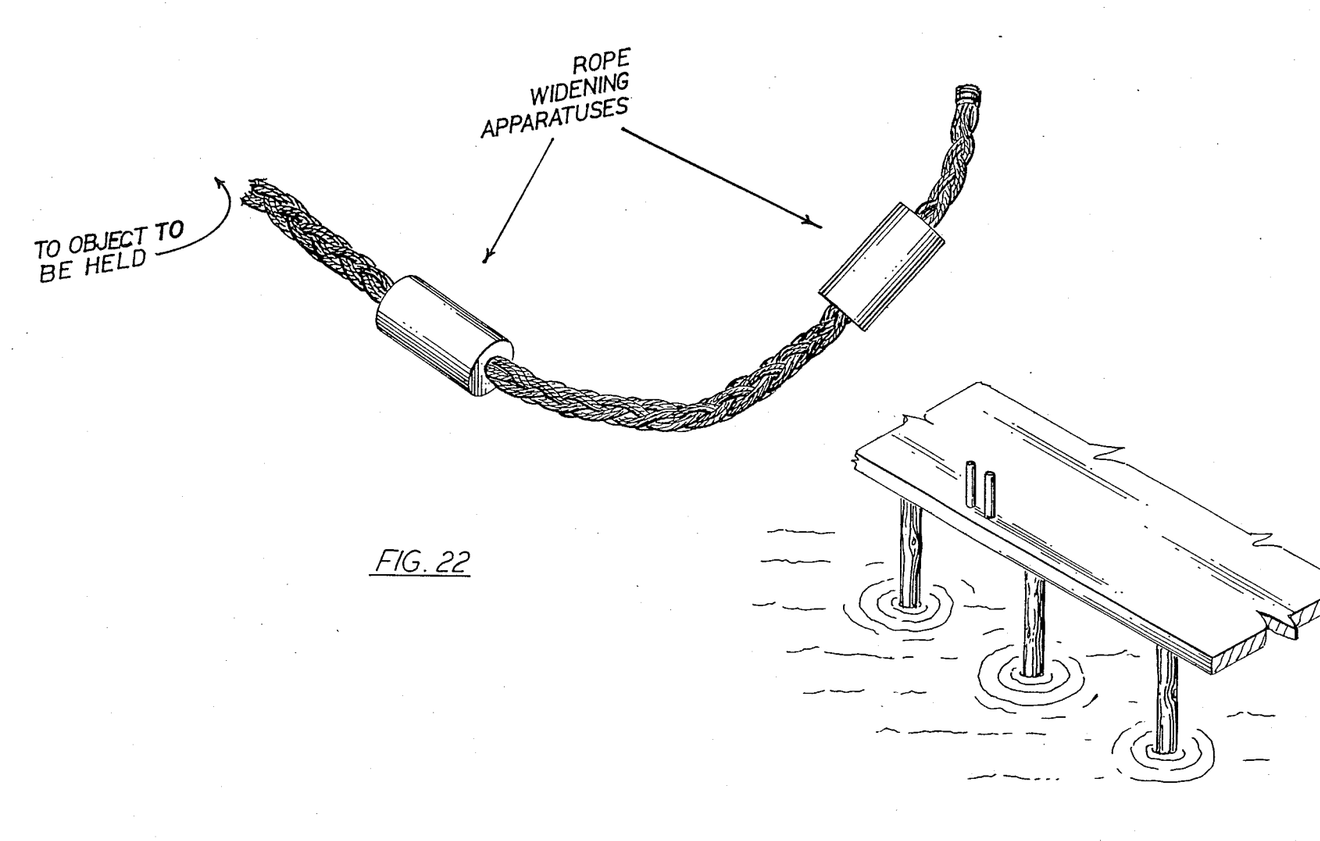
FIG. 22 is a perspective view of an embodiment of two rope widening apparatuses attached to a rope.

Alternatively, with the appliance 21b shown in FIG. 21, the structure of which will be further described, the longitudinal tensile force on the rope R, after following the aforementioned path to the case front portion 30, goes to the case rear portion 40b and its arms 44b and 45b, then to the clevis pin 46b and then to whatever the clevis pin 46b is hooked into.

It may be observed that when a tensile force is pulling downstream from a direction from the case front portion 30 to the case rear portion 40, and therefore the rope tends to move in a direction from aperture 42, over the sliding bolt 22 and through cavity 50 and out of the aperture 32, the strand groups compress longitudinally or crowd upstream of the upstream tapered portion 29 and expand longitudinally in front of the downstream convex conical pressing surface 23. Put another way, there are more strand group crossover points per linear inch of rope upstream of the sliding bolt than downstream of it. Therefore, it may be observed that the rope becomes shorter upstream of the sliding bolt and longer downstream of the sliding bolt upon the application of a longitudinal tensile force.

It may also be observed that upon the application of a longitudinal tensile force, the strand groups transversely compress around the upstream tapered portion 29. That is, the strand groups lock tighter around the upstream tapered portion 29 and the longitudinal tensile force is partially spread around the upstream tapered portion 29.

In addition, some of the force in the rope is dissipated at the points where the strand groups cross each other by the fids presented to these intercrossings. That is, the fids are presented to the intercrossings and absolutely prevent them from passing downstream of the fids. Therefore, the fids 26 must extend radially beyond the strand groups. And, therefore, the surfaces of the fids 26 must be smooth and rounded.

This patent primarily describes the principle of the pressing surface on the sliding bolt pressing the rope against the pressing surfaces on the case front portion, rather than the operation of the upstream tapered portion 29. The operation of the rear tapered portion 29 is more fully described in this inventor's patent application filed concurrently with this patent application. That is, the pressing surfaces principle can be used without the use of the upstream tapered portion 29, so that there would be a flat surface behind the group of radial fids 26. However, such omission is undesirable because the rope would be cut over the then sharp circular edge at the upstream end of the sliding bolt at the base of the fids 26.

As mentioned hereinabove, only tubular interlocking stranded rope can be used. In contrast, a braided flat band is an example of an interlocking stranded item that is not suitable for use with this invention (unless it can be arranged uniformly and substantially to surround an object) because it can only be held by a rod or a series of rods or threads passing transversely between the strands or strand groups. Also in contrast, a common three strand twisted rope is not suitable for use with this invention, although the strands can be arranged to uniformly and substantially surround an object (thereby meeting the tubular requirement) because the strands cannot be caused to lock around and upstream of the sliding bolt.

The sliding bolt 22 may be placed into the tube-like structure formed by the strand groups of the rope R by any suitable method of loosening the interlocking strand groups and expanding the diameter of the rope sufficiently so that the sliding bolt 22 may be symmetrically placed therebetween. For example, the tube can be compressed longitudinally and the strands drawn manually in a longitudinal direction between two points spaced equidistantly from the zone desired to be expanded. This results in the desired transverse expansion accompanied by relative loosening of the strands, one from another, at the expanded zone whereby to permit the sliding bolt to be slipped between the strands for location in the hollow center of the rope at said zone. The interlocking strand groups are then drawn snug onto the sliding bolt 22 so that an equal number of strand groups of the rope R are drawn adjacent to each radial fid 26 and into each associated groove 27 of the sliding bolt 22.

In addition, the sliding bolt 22 may be placed within the strand groups of the rope during the manufacturing process of the rope prior to intercrossing the strand groups at the zone of sliding bolt placement.

The case front portion 30 and the case rear portion 40, while separated, are placed over the sliding bolt 22 and the rope R by feeding one end of the rope R through the aperture 32, the other end of the rope R through the aperture 42, and screwing the case portion 30 and 40 together so as to form cavity 50, enclosing the sliding bolt 22 therein. That is to say, the separated two halves of the case are threaded onto the rope in proper orientation before or after the sliding bolt is placed inside the rope, after which the two halves are joined.

Figure 9:
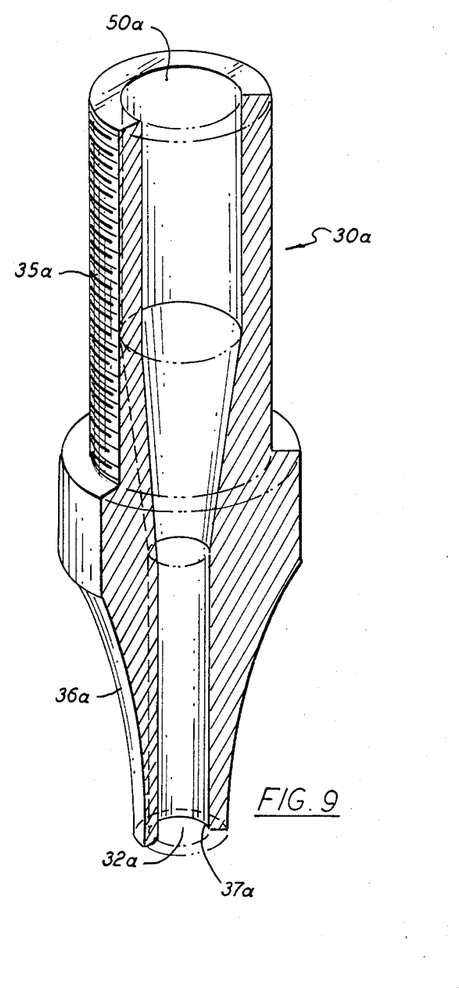
FIG. 9 is a perspective view, partially in section and partially in phantom, of an alternative embodiment of the front portion of the case with the addition of a chafe preventing abutting surface, and with much of its exterior surface threaded to accept an internally threaded sleeve.
Figure 20:
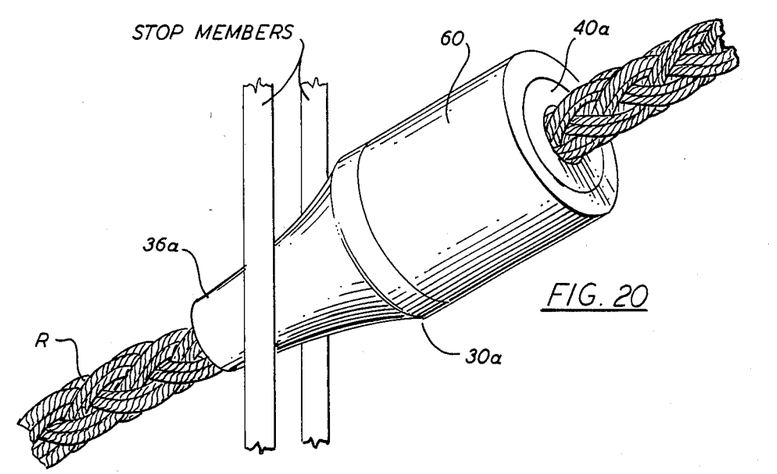
FIG. 20 is a perspective view of the embodiment of the front portion of the case shown in FIG. 9 and the embodiment of the rear portion of the case shown in FIG. 10, both held together by the sleeve shown in FIG. 13, and showing the chafe preventing abutting surface in contact with stop members.

Now describing various alternative embodiments, FIGS. 9 and 20 show a case front portion 30a wherein the abutting surface 36a is an approximately conical shape, with the narrow segment near the orifice 37a becoming generally cylindrical. As shown in FIG. 20, the stop members are placed sufficiently far apart to allow insertion of the narrow segment but close enough together to prevent the rope widening apparatus from passing downstream of the stop members when a longitudinal tensile force is applied to the rope. The purpose of the narrow segment of the abutting surface 36a is to permit insertion thereof between the stop member and to touch the surfaces of the stop member so that the rope will not touch and be abraided by rubbing against the surfaces of the stop member.

Figure 10:
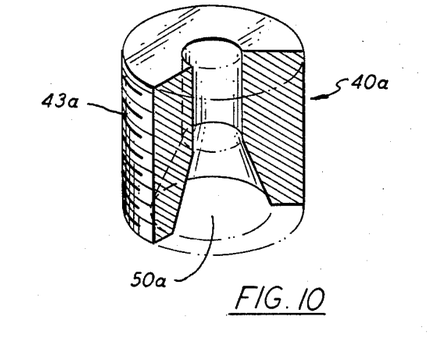
FIG. 10 is a perspective view, partially in section and partially in phantom, of an alternative embodiment of the back portion of the case with its exterior surface threaded to accept an internally threaded sleeve.
Figures 11, 12, 13:
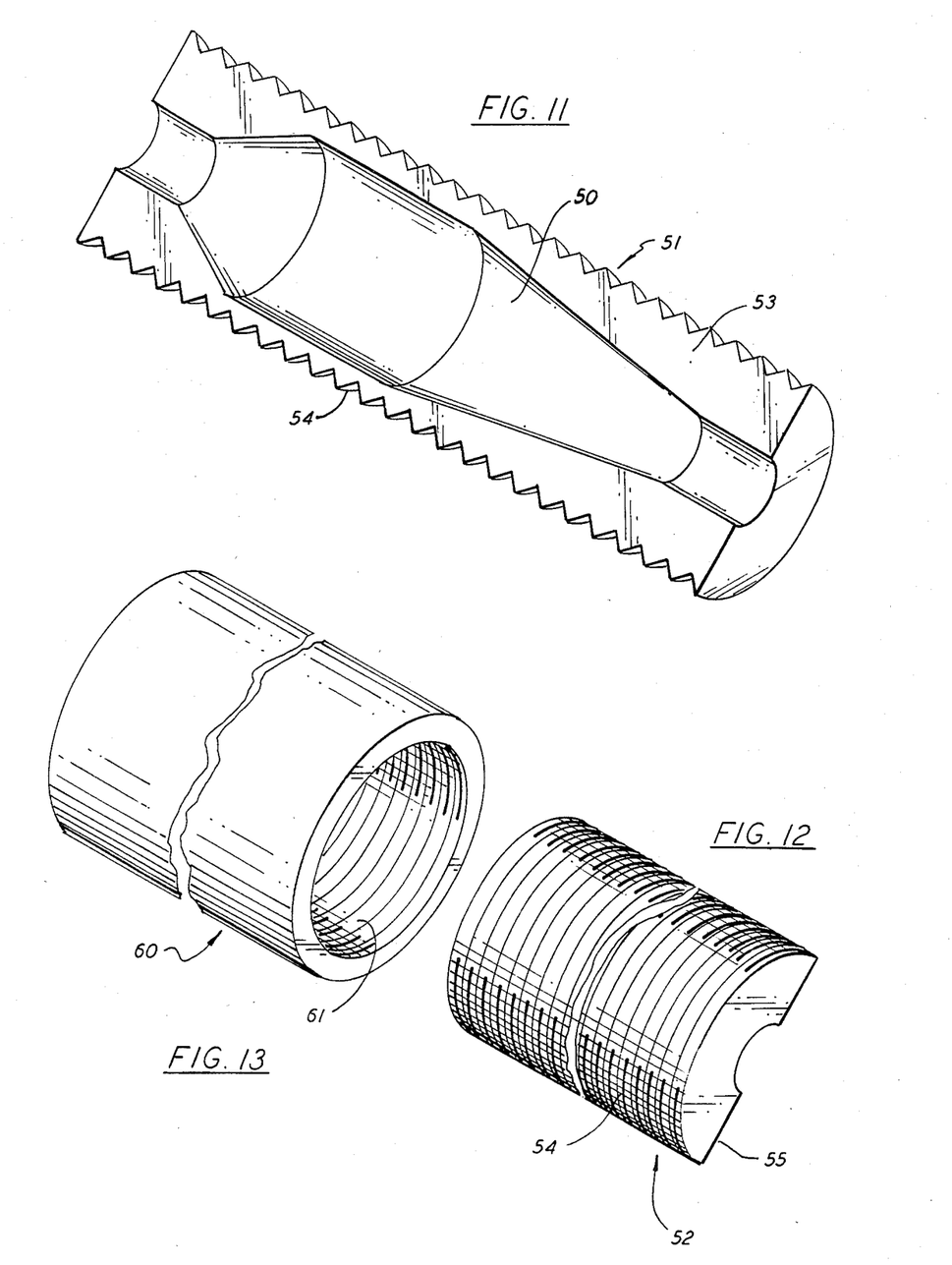
FIG. 11 is a perspective view of one half of an alternative embodiment of the case, showing the inside or cavity portion. This half is cut longitudinally to provide an alternative method of placing the case over the portion of the rope passing through the apertures and surrounding the sliding bolt.
FIG. 12 is an outside perspective view of the other half of the case shown in FIG. 11.
FIG. 13 is a perspective view of a sleeve used to hold together the two longitudinally cut case half portions shown in FIGS. 11 and 12, or the case front portion shown in FIG. 9 to the case rear portion shown in FIG. 10.

Also, as shown in FIG. 9, much of the exterior surface of the case front portion 30a has external threads 35a to be mated to the internal threads 61 of the sleeve 60 shown in FIG. 13. The threads 61 are also adapted to fit the external threads 43a of the case rear portion 40a shown in FIG. 10. The case rear portion 40a differs from the case rear portion 40 shown in FIG. 8 only by the external threads. The case rear portion 40a is to be used in conjunction with case front portion 30a.

FIG. 20 also shows the case front portion 30a, the case rear portion 40a and the sleeve 60 mounted over rope R and threaded together, and in operation. FIG. 20 assumes that a portion of the rope R within the case portions is disposed over an appropriate sliding bolt. The operation and construction of the case front portion 30a, the case rear portion 40a and the sleeve 60 are otherwise substantially the same as the embodiment shown in FIGS. 1 and 2, and will not be further described herein.

Another alternative embodiment of the case is shown in FIGS. 11 and 12, Case portions 51 and 52 are longitudinal sections to provide an easier method of placing the rope R previously disposed over sliding bolt 22 in the usual fashion, into cavity 50. A longitudinal half of cavity 50 is on each of longitudinal case portions 51 and 52. Mating exterior threads 54 are on the curved surfaces of longitudinal case portions 51 and 52 so that when the surfaces 53 and 55 of the case portions 51 and 52 respectively are placed together, thereby forming cavity 50, the sleeve 60 shown in FIG. 13 with the internal mating threads 61, may be threadibly placed onto the external threaded portion 54 to securely hold longitudinal case portions 51 and 52 together. In addition, a lock nut may be used in conjunction with the sleeve 60.

After a number of sliding bolts are mounted within the strands of a rope at desired intervals, the rope may be drawn through the same number of sleeves 60 and the sleeves placed next to the section of the rope where the sliding bolt is mounted. Because, of course, the inside diameters of the sleeves 60 are larger than the outside diameters of the sliding bolts mounted within the rope strands. The case half portions 51 and 52 may be placed over the sliding bolts and the sleeves threaded over them. The operation and construction of longitudinal case portions 51 and 52 are otherwise substantially the same as case portions 30 and 40 and will not be further described herein.

Figures 14, 15, 16:
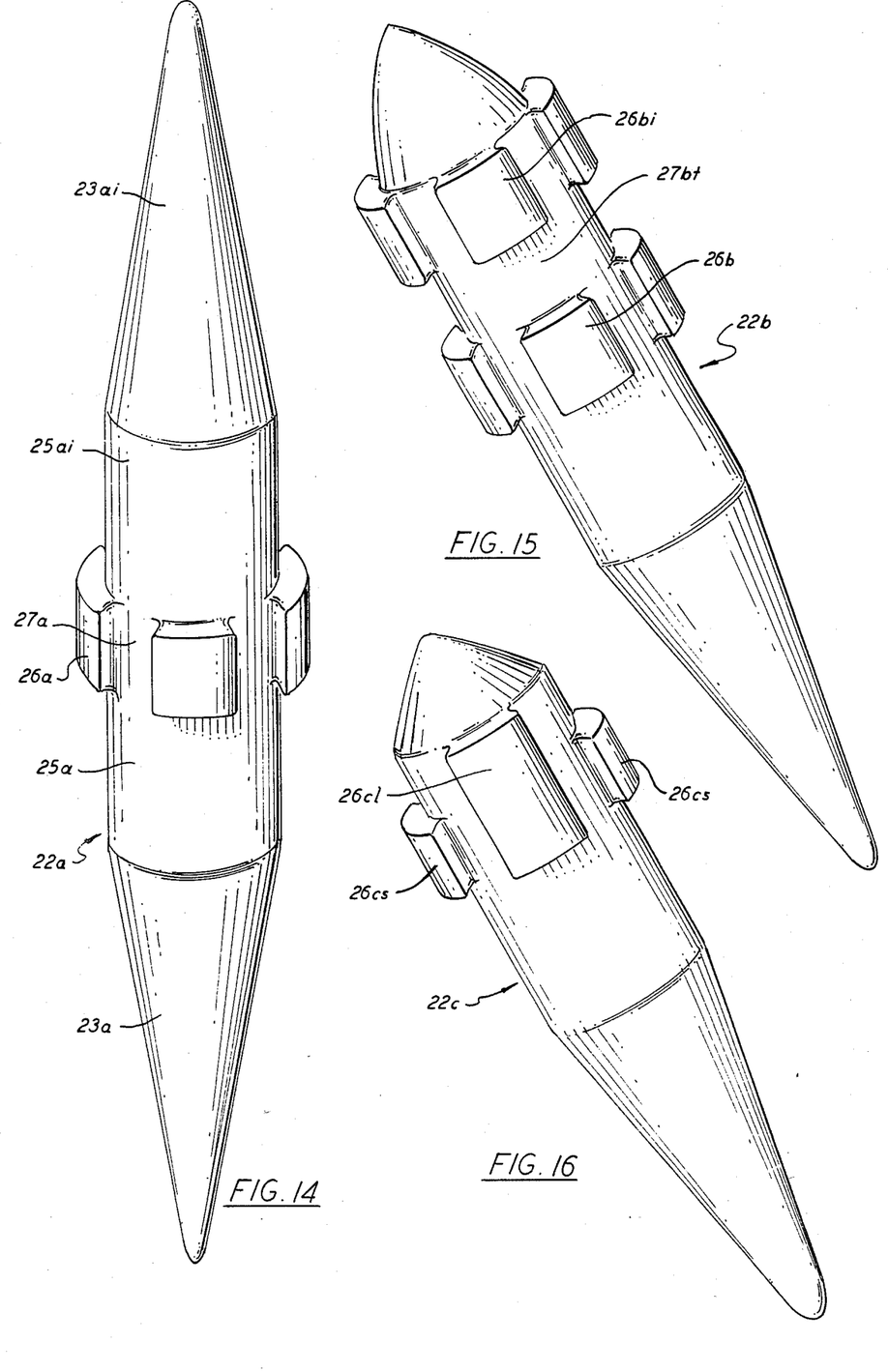
FIG. 14 is a perspective view of an alternative embodiment of the sliding bolt but with two convex conical pressing surfaces for pressing against an appropriate embodiment of the case and its concave frustum pressing surfaces so that the tensile force may be applied on the rope in two directions.
FIG. 15 is a perspective view of an alternative embodiment of the sliding bolt with two rows of protruding fids, transversely separated by a groove, thereby causing the rope to form an X shape between the longitudinally spaced protruding fids.
FIG. 16 is a perspective view of an alternative embodiment of the sliding bolt with long and short protruding fids.

An alternative embodiment of the sliding bolt 22 is shown in FIG. 14 and depicted as sliding bolt 22a. Unlike sliding bolt 22, it has two convex conical pressing surfaces 23a and 23ai, and two cylindrical portions 25a and 25ai. As with sliding bolt 22, there is only one group of radial fids 26a, and associated grooves 27a. The construction and operation of sliding bolt 22a and convex conical pressing surface 23a is the same as the convex conical pressing surface 23 when a tensile force acts on a rope thereabout disposed, which acts to draw the rope R in a direction from the group of radial fids 26a toward the tip of convex conical pressing surface 23a. In that case, the convex conical pressing surface 23ai, having the rope R drawn from its tip towards its base, acts in the same fashion as the upstream cone 29 of the sliding bolt 22. Further, the radial fids 26a and the grooves 27a function in the same way as the corresponding parts on sliding bolt 22. Of course, a cavity similar to cavity 50 is provided for use with sliding bolt 22a but contoured specially to fit insert 22a. Therefore, in the embodiment shown in FIG. 14 and its appropriately contoured cavity, a longitudinal tensile force may be applied to the rope in either direction.

Another alternative embodiment of the sliding bolt 22 is shown in FIG. 15 and labeled as 22b. It differs from sliding bolt 22 because it has two rows of radial fids 26b and 26bi. The rope R is disposed over sliding bolt 22b such that the rope R forms a letter X on opposite sides of the sliding bolt 22b and in the transverse groove 27bt bordered by the group of radial fids 26b and 26bi. The operation and construction of sliding bolt 22b is otherwise substantially the same as that of sliding bolt 22 and will therefore not be further described herein.

Another alternative embodiment of the sliding bolt 22 is shown in FIG. 16 and labeled as 22c. It differs from sliding bolt 22 in that two of the four radial fids 26cs, radially disposed on opposite sides of the sliding bolt 22c, are shorter than the radial fids 26cl, also radially disposed on opposite sides of the sliding bolt 22c. Its purpose is to more nearly fit the alternatingly longitudinally disposed strand crossovers found on the rope R. As in all the sliding bolts illustrated herein, they are adapted to fit the number of strands or strand groups found on a particular rope. The operation and construction of sliding bolt 22c is otherwise substantially the same as that of sliding bolt 22 and will therefore not be further described herein.

Figures 17, 18, 19:
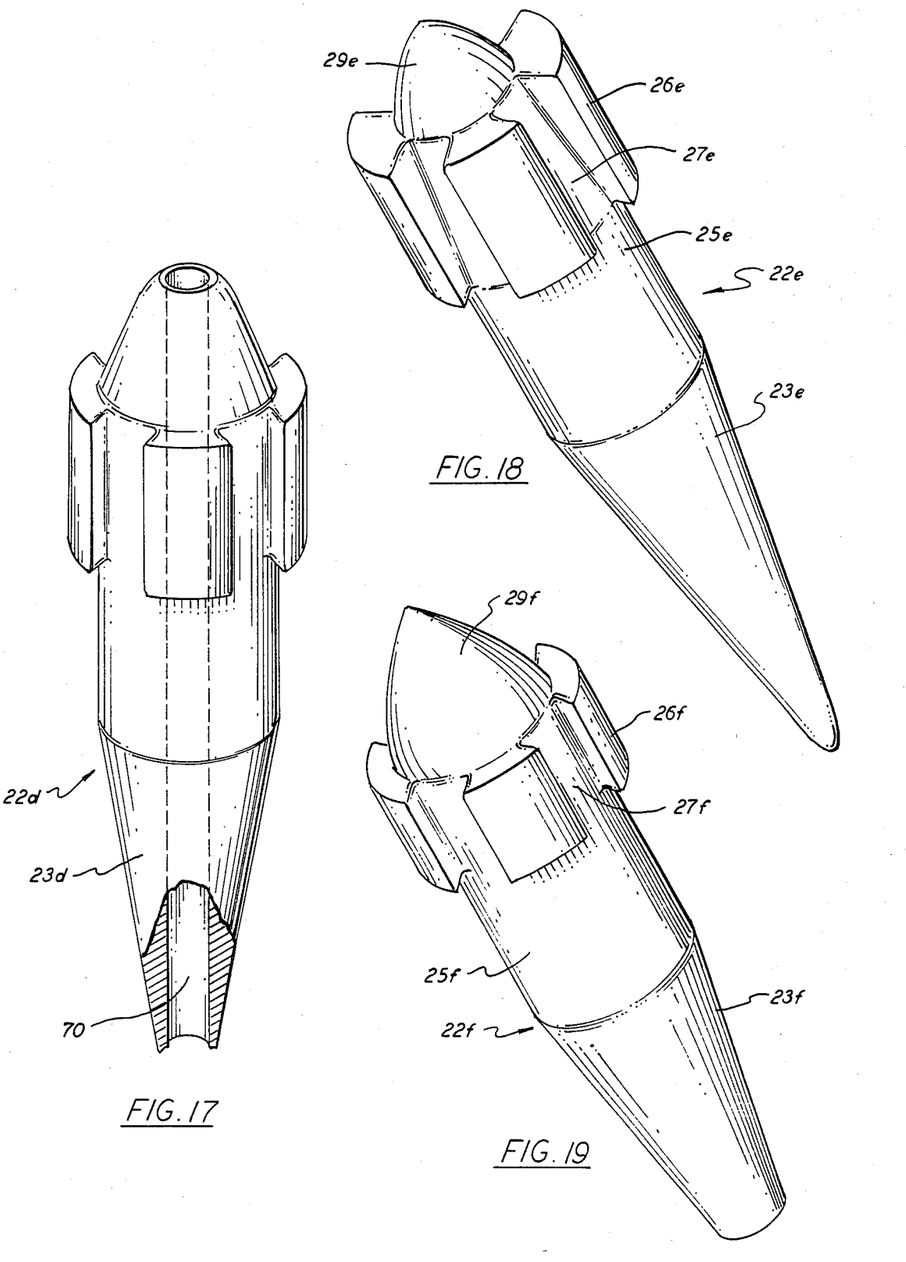
FIG. 17 is a perspective view of an alternative embodiment of the sliding bolt with a longitudinal channel therethrough.
FIG. 18 is a perspective view of an alternative embodiment of the sliding bolt but with grooves slanted inward and upstream so that the protruding fids begin at a shorter radius of the sliding bolt at their upstream ends than at their downstream ends.
FIG. 19 is a perspective view of an alternative embodiment of the sliding bolt but without the tip of the cone forming the downstream convex conical pressing surface. Therefore, this sliding bolt has a downstream convex frustum pressing surface rather than a downstream convex conical pressing surface.

Another alternative embodiment of the sliding bolt 22 is shown in FIG. 17 and labeled as 22d. It differs from sliding bolt 22 in that there is a longitudinal channel 70 passing through the sliding bolt. Therefore, the downstream convex conical pressing surface becomes a downstream convex frustum pressing surface 23d. A case is appropriately adapted to fit the sliding bolt. Channel 70 is a non-collapsing and therefore a non-gripping channel. The purpose of the channel 70 is to allow a cable such as an electrical cable, etc., to pass therethrough, and through the tube formed by the rope, thereby protecting the cable from a longitudinal tensile force, as this force is taken up by the rope, sliding bolt and the case front portion. The operation and construction of sliding bolt 22d is otherwise substantially the same as that of sliding bolt 22 and will therefore not be further described herein.

Another alternative embodiment of the sliding bolt 22 is shown in FIG. 18 and labeled as 22e. It differs from sliding bolt 22 in that the grooves 27e are slanted in relation to the longitudinal axis of the slidinb bolt 22e such that the diameter of the base of the upstream conical surface 29e is shorter than the diameter of cylindrical surface 25e. Thus, the inner portions of the radial fids have thin sections at their upstream ends, widening to thick sections at their downstream ends. The grooves 27e form a smooth unstepped surface with the base of conical surface 29e and cylindrical surface 25e. The operation and construction of sliding bolt 22e is otherwise substantially the same as that of sliding bolt 22 and will therefore not be further described herein.

Another alternative embodiment of the sliding bolt 22 is shown in FIG. 19 and labeled as 22f. It differs from sliding bolt 22 in that the tip of the downstream convex conical pressing surface 23 is removed, forming therefore substantially a downstream convex frustum pressing surface 23f. The purpose of removing the tip is to prevent the tip from being forced too deeply into the aperture 32. So that, the rope cannot be cut by too much force being concentrated against the rope at the juncture of the concave pressing surface 31 and the aperture 32 by the convex pressing surface 23 of the sliding bolt 22. Thus, all of the convex pressing surface 23f and the concave pressing surface 31 will be used to press the rope therebetween. The appropriateness of this configuration depends upon the material used for the rope, the construction of the rope and the angular relationship of the convex pressing surface 23 to the concave pressing surface 31.

All the embodiments of the sliding bolt show a central cylindrical portion 25. This central cylindrical portion is necessary so that the radial fids 26 do not abut against the downstream concave frustum pressing surface 31 thereby rendering ineffective the pressing surface on the rope. However, if the sliding bolt were proportionately wider or if the downstream surface of the radial fids were beveled or slanted upstream, such a central cylindrical portion may be made shorter or eliminated altogether.

Regardless of taper shape, both tapers of the sliding bolt must be as smooth and polished as possible. They must be neither abrasive nor have hooks, as shown in Dupuy, U.S. Pat. No. 4,295,250, as such would tend to tear the rope fibers and serve no purpose. The tapers must be neither fluted nor have lands and grooves nor ridges, neither helical, nor longitudinal, as shown in Feige, U.S. Pat. No. 2,032,567, Clark, U.S. Pat. No. 2,935,776, Blackburn, U.S. Pat. Nos. 1,909,332 and 2,017,887, Rovinsky, U.S. Pat. No. 3,600,765, nor transverse, as shown in Fiege, U.S. Pat. No. 1,958,747, as it is believed that such would create points over which force in the rope would concentrate when the rope is under tension. Because, the strand groups change their angular relationship, one to another, with changes in tension, and would, therefore, not remain in any grooves on a taper. Furthermore, it is believed that longitudinal or helical grooves on the rear taper 29, in which the strand groups might nest, would tend to reduce the compressive effect of the strand groups on the rear taper 29 when the rope is under tension and therefore reduce the holding effect of the taper 29.

There are numerous variations of tubular interlocking stranded rope, each with its own number and unique configuration of strands and strand groups. For each such configuration, a specially configured sliding bolt may be used, with an appropriate number of radial fids extending radially from the surface of the sliding bolt and protruding between and past the interlocking strand groups. Therefore, for a rope with, say sixteen strand groups, an insert may be designed with sixteen radial fids and grooves.

Alternatively, the principles disclosed in this patent, using the example of the 4-radial fid-4-groove sliding bolt shown herein, may also be applied to rope with other than four strand groups or with rope having an outer set of tubular interlocking strands disposed over an inner set of tubular interlocking strands. That is, it is not necessary that the number of radial fids and grooves of the sliding bolt be equal to the number of strand groups of a given tubular interlocking stranded rope. For example, tubular interlocking stranded rope known as yacht braid or double braid may be used. Such a rope may have an inner tube of 8 strand groups, with 4 strands in each strand group. Therefore, each groove of the 4-radial fid-4-groove sliding bolt would receive two strand groups or 8 strands. The outer tube of such a rope may have sixteen strand groups, with 2 strands in each strand group. Therefore, each groove of the 4-radial fid-4-groove sliding bolt would receive 4 strand groups with also 8 strands.

As another example, a yacht braid or double braid rope may have the same inner tube configuration as in the example above, but with an outer tube of twenty strand groups, with two strands in each strand group, and with 10 strand groups turning left and ten strand groups turning right. Therefore, from the ten strand groups turning right, three strand groups would be disposed in one groove. In the adjacent groove, two strand groups would be disposed. In the next adjacent groove, three strand groups would be disposed; and in the next adjacent groove, two strand groups, for a total of ten strand groups. The strand groups turning left would be disposed in the grooves in the same way as the strand groups turning right. But, in those two grooves wherein there are disposed three right turning strand groups, there would be disposed two left turning strand groups. And, in those two grooves where there are disposed two right turning strand groups, there would be disposed three left turning strand groups. Thus, making a total of five strand groups in each groove and 20 strand groups in the four grooves. And, thus, disposing the rope symmetrically around the sliding bolt.

FIG. 21 shows an alternative embodiment of the case rear portion 40 and is labeled 40b. It differs from the case rear portion 40 in that the fork-like extensions 44b and 45b in conjunction with clevis pin 46b passing through aligned apertures 47b and 48b form a shackle. The shackle may be attached in the conventional manner to an appropriate eye piece on a desired object. The cotter pin 49b passing through a circular channel in clevis pin 46b and used in the conventional manner prevents the clevis pin 46b from falling out of aligned apertures 47b and 48b and therefore from losing contact with the fork-like extensions 44b and 45b.

FIG. 21 also shows the tail end of rope R emerging from aperture 42b. Assuming that the rope R is not abraided inside the case portions and therefore will not tear, as long as the upstream end of rope R remains braided, the rope R will not be drawn out of the rope widening apparatus 21b. To keep the rope R from unraveling, i.e., to prevent the strands upstream of the sliding bolt from opening and therefore losing the locking effect, it is best to whip the ends of the rope R. If, however, the aperture 42b is long enough to contain sufficient crossover points, such whipping of the upstream end of the rope R may not be absolutely necessary.

For clarity, the drawings show some parts of the inserts and cases with sharp corners. However, the embodiments of the invention function best when all surfaces touching the rope are smooth and without corners so that the rope will be neither abraided nor cut, nor the strand groups pierced by, for example, a point on a conical portion of the sliding bolt. Further, the rope widening apparatus should be so constructed that the rope makes as few bends as possible, and such bends as are present should have the longest radii possible, so that the rope is as free of stress concentration points as possible.

In the foregoing embodiments, either pliant fabric or stiff metal rope may be used, although this invention was designed with pliant fabric rope in mind. However, regardless of material, it must be woven rope. And, although metal section lines were chosen for the drawings of the sliding bolt and case, it is to be understood that any other suitable rigid material such as plastic, nylon or the like may be used. While preferred embodiments have been shown and described, it is to be understood that numerous changes can be made without departing from the essence and scope of the invention, as set forth herein and in the appended claims.

I claim:

1. A rope widening apparatus in combination with a longitudinally intermediate section of tubular interlocking stranded rope, said rope comprising a plurality of strands or strand groups, forming stitches arrayed in sets on numerous circumferential transverse planes along said rope, said rope widening apparatus comprising a rigid non-collapsable case and a rigid sliding bolt, said sliding bolt adapted to be centrally disposed within a transversely expanded portion of said strands or strand groups of said rope, said sliding bolt as thus disposed, adapted to slide within an elongated circular cavity of said case upon the application of a longitudinal tensile force on said rope, to uniformly press said rope between a downstream smooth and ungrooved convex tapered pressing surface on said sliding bolt and a downstream smooth and ungrooved concave frustum pressing surface on said elongated circular cavity, said elongated circular cavity and said sliding bolt each having a longitudinal axis, the longitudinal extent of said sliding bolt being less than the longitudinal extent of said elongated circular cavity, said sliding bolt comprising a plurality of radial fids defining grooves between them for said strands or strand groups to nest in said grooves, said radial fids and said elongated circular cavity dimensioned such that said radial fids do not contact said downstream tapered pressing surface, said radial fids extending parallel to said longitudinal axes and extending radially beyond said nested strands or strand groups for engaging said stitches so as to catch said sliding bolt within said rope so as to limit downstream movement of said rope relative to said sliding bolt and for maintaining said sliding bolt centrally disposed within said rope, and for maintaining given sets of stitches upstream of said radial fids, and to cause said strands or strand groups of said rope to lock tighter around and upstream of a smooth and ungrooved upstream tapered surface on said sliding bolt to prevent said sliding bolt from moving longitudinally along said rope, thus causing said sliding bolt to move in unison with said rope relative to said elongated circular cavity to said case upon the application of a longitudinal tensile force on said rope which pulls said downstream smooth and ungrooved convex tapered pressing surface of said sliding bolt toward said downstream smooth and ungrooved concave frustum pressing surface of said elongated circular cavity of said case, said elongated circular cavity of said case including a cylindrical non-tapered portion dimensioned such that said fids are spaced from said cylindrical non-tapered surface defining said cylindrical portion, said elongated circular cavity of said case further including a downstream aperture and an upstream aperture at each longtiudinal end and aligned along the longitudinal axis of said elongated circular cavity for said rope to pass therethrough, the diameters of said apertures being at least large enough to allow unexpanded portions of said rope to pass slidably snug therethrough, said downstream aperture being adjacent to the small end of said downstream smooth and ungrooved concave frustum pressing surface, and the diameter being too small to allow said portion of said rope transversely expanded over said sliding bolt to pass therethrough, said case comprising means for transferring the longitudinal tensile force on said rope to a desired object.

2. An apparatus in accordance with claim 1 wherein said downstream smooth and ungrooved convex tapered pressing surface of said sliding bolt comprises a downstream smooth and ungrooved convex conical pressing surface.

3. An apparatus in accordance with claim 1 wherein said downstream smooth and ungrooved convex tapered pressing surface of said sliding bolt comprises a downstream smooth and ungrooved convex frustum pressing surface.

4. An apparatus in accordance with claim 1 wherein said smooth and ungrooved upstream tapered surface of said sliding bolt comprises a smooth and ungrooved upstream convex conical pressing surface.

5. An apparatus in accordance with claim 1, wherein said smooth and ungrooved upstream tapered suface of said sliding bolt comprises an upstream smooth and ungrooved convex frustum pressing surface.

6. An apparatus in accordance with claim 1, wherein the sliding bolt comprises two sets of radially protruding fids.

7. An apparatus in accordance with claim 1, wherein the sliding bolt comprises at least one set of radially protruding fids positioned between the smooth and ungrooved tapered surfaces with a different length than another set of radially protruding fids on said sliding bolt.

8. An apparatus in accordance with claim 1, wherein each of said radially protruding fids has a thin upstream section compared to a thick downstream section.

9. An apparatus in accordance with claim 1, wherein said radially protruding fids are of equal length.

10. An apparatus in accordance with claim 1, wherein the sliding bolt comprises a convex cylindrical surface positioned at the large circle of the downstream smooth and ungrooved convex tapered pressing surface whose diameter is the same as the diameter of the large circle of said downstream smooth and ungrooved convex tapered pressing surface.

11. An apparatus in accordance with claim 1, wherein the sliding bolt comprises an aperture passing longitudinally therethrough.

12. An apparatus in accordance with claim 1, wherein the sliding bolt comprises two smooth and ungrooved convex tapered pressing surfaces.

13. An apparatus in accordance with claim 1, wherein the aperture at the upstream longitudinal end of said elongated circular cavity of said case and extending upstream of said sliding bolt has a diameter too small to pass the portion of said rope transversely expanded over said sliding bolt, and to provide a slidable snug fit of said transversely unexpanded portion of said rope.

14. An apparatus in accordance with claim 1, wherein the case has an inside surface which comprises two concave frustum pressing surfaces.

15. An apparatus in accordance with claim 1, wherein the case comprises portions disassembleable along a longitudinal plane.

16. An apparatus in accordance with claim 1, wherein the case comprises portions disassembleable along a transverse plane.

17. An apparatus in accordance with claim 1, wherein the case has at least a portion of its exterior surface forming an abutting surface for use with a stop member.

18. An apparatus in accordance with claim 1, wherein the case has at least a portion of the exterior surface comprising means for preventing the rope from abraiding against the surface of a stop member.

19. An apparatus in accordance with claim 1, wherein the case has a portion of its exterior surface in the form of a shackle.

20. A rope widening apparatus in combination with a longitudinally intermediate section of tubular interlocking stranded rope, said rope comprising a plurality of strands or strand groups, forming stitches arrayed in sets on numerous circumferential transverse planes along at least the upstream portion of said rope, said rope widening apparatus comprising a rigid non-collapsable case and a rigid sliding bolt, said sliding bolt adapted to be centrally disposed within a transversely expanded portion of said strands or strand groups of said rope, said sliding bolt as thus disposed, adapted to slide within an elongated circular cavity of said case upon the application of a longitudinal tensile force on said rope, to uniformly press said rope between a downstream smooth and ungrooved convex tapered pressing surface on said sliding bolt and a downstream smooth and ungrooved concave frustum pressing surface on said elongated circular cavity, said elongated circular cavity and said sliding bolt each having a longitudinal axis, the longitudinal extent of said sliding bolt being less than the longitudinal extend of said elongated circular cavity, said sliding bolt comprising a plurality of radial fids defining grooves between them for said strands or strand groups to nest in said grooves, said radial fids and said elongated circular cavity dimensioned such that said radial fids do not contact said downstream tapered pressing surface, said radial fids extending parallel to said longitudinal axes and extending radially beyond said nested strands or strand groups for engaging said stitches so as to catch said sliding bolt within said rope so as to limit downstream movement of said rope relative to said sliding bolt and for maintaining said sliding bolt centrally disposed within said rope, and for maintaining given sets of stitches upstream of said radial fids, and to cause said strands or strand groups of said rope to lock tighter around and upstream of a smooth and ungrooved upstream tapered surface on said sliding bolt to prevent said sliding bolt from moving longitudinally along said rope, thus causing said sliding bolt to move in unison with said rope relative to said elongated circular cavity of said case upon the application of a longitudinally tensile force on said rope which pulls said downstream smooth and ungrooved convex tapered pressing surface of said sliding bolt toward said downstream smooth and ungrooved concave frustum pressing surface of said elongated circular cavity of said case, said elongated circular cavity of said case including a cylindrical non-tapered portion dimensioned such that said fids are spaced from said cylindrical non-tapered surface defining sadi cylindrical portion, said elongated circular cavity of said case further including a downstream aperture and an upstream aperture at each longitudinal end and aligned along the longitudinal axis of said elongated circular cavity for said rope to pass therethrough, the diameters of said apertures being at least large enough to allow unexpanded portions of said rope to pass slidably snug therethrough, said downstream aperture being adjacent to the small end of said downstream smooth and ungrooved concave frustum pressing surface, and the diameter being too small to allow said portion of said rope transversely expanded over said sliding bolt to pass therethrough, said case comprising means for transferring the longitudinal tensile force on said rope to a desired object.

21. An apparatus in accordance with claim 20 wherein said downstream smooth and ungrooved convex tapered pressing surface of said sliding bolt comprises a downstream smooth and ungrooved convex conical pressing surface.

22. An apparatus in accordance with claim 20 wherein said downstream smooth and ungrooved convex tapered pressing surface of said sliding bolt comprises a downstream smooth and ungrooved convex frustum pressing surface.

23. An apparatus in accordance with claim 20 wherein said smooth and ungrooved upstream tapered surface of said sliding bolt comprises a smooth and ungrooved upstream convex conical pressing surface.

24. An apparatus in accordance with claim 20, wherein said smooth and ungrooved upstream tapered surface of said sliding bolt comprises an upstream smooth and ungrooved convex frustum pressing surface.

25. An apparatus in accordance with claim 20, wherein the sliding bolt comprises two sets of radially protruding fids.

26. An apparatus in accordance with claim 20, wherein the sliding bolt comprises at least one set of radially protruding fids positioned between the smooth and ungrooved tapered surfaces with a different length than another set of radially protruding fids on said sliding bolt.

27. An apparatus in accordance with claim 20, wherein each of said radially protruding fids has a thin upstream section compared to a thick downstream section.

28. An apparatus in accordance with claim 20, wherein said radially protruding fids are of equal length.

29. An apparatus in accordance with claim 20, wherein the sliding bolt comprises a convex cylindrical surface positioned at the large circle of the downstream smooth and ungrooved convex tapered pressing surface whose diameter is the same as the diameter of the large circle of said downstream smooth and ungrooved convex tapered pressing surface.

30. An apparatus in accordance with claim 20, wherein the sliding bolt comprises an aperture passing longitudinally therethrough.

31. An apparatus in accordance with claim 20, wherein the sliding bolt comprises two smooth and ungrooved convex tapered pressing surfaces.

32. An apparatus in accordance with claim 20 wherein the aperture at the upstream longitudinal end of said elongated circular cavity of said case and extending upstream of said sliding bolt has a diameter too small to pass the portion of said rope transversely expanded over said sliding bolt, and to provide a slidable snug fit of said transversely unexpanded portion of said rope.

33. An apparatus in accordance with claim 20, wherein the case has an inside surface which comprises two concave frustum pressing surfaces.

34. An apparatus in accordance with claim 20 wherein the case comprises portions disassembleable along a longitudinal plane.

35. An apparatus in accordance with claim 20, wherein the case comprises portions disassembleable along a transverse plane.

36. An apparatus in accordance with claim 20, wherein the case has at least a portion of its exterior surface forming an abutting surface for use with a stop member.

37. An apparatus in accordance with claim 20, wherein the case has at least a portion of its exterior surface comprising means for preventing the rope from abraiding against the surface of a stop member.

38. An apparatus in accordance with claim 20, wherein the case has a portion of its exterior surface in the form of a shackle.

39. A tubular interlocking stranded rope in combination with a rope widening apparatus as in claim 20.

40. A tubular interlocking stranded rope in combination with a rope widening apparatus as in claim 20, comprising a plurality of said rope widening apparatuses disposed in spaced apart relation, one from another, along the length of said rope.

* * * * *